US008463024B1

(12) United States Patent
Gallup et al.

(10) Patent No.: US 8,463,024 B1
(45) Date of Patent: Jun. 11, 2013

(54) COMBINING NARROW-BASELINE AND WIDE-BASELINE STEREO FOR THREE-DIMENSIONAL MODELING

(75) Inventors: David Gallup, Lynnwood, WA (US); Aleksey Golovinskiy, Mountain View, CA (US); Michael Hongmai Lin, Mountain View, CA (US); Tilman Reinhardt, Woodside, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/480,875

(22) Filed: May 25, 2012

(51) Int. Cl.
*G06K 9/00* (2006.01)
*G06T 17/00* (2006.01)

(52) U.S. Cl.
USPC .......................................... 382/154; 345/420

(58) Field of Classification Search
None
See application file for complete search history.

(56) References Cited

U.S. PATENT DOCUMENTS

| | | | | | |
|---|---|---|---|---|---|
| 4,982,438 | A | * | 1/1991 | Usami et al. | 382/154 |
| 6,009,359 | A | * | 12/1999 | El-Hakim et al. | 701/28 |
| 6,912,293 | B1 | | 6/2005 | Korobkin | |
| 6,970,593 | B2 | | 11/2005 | Furukawa | |
| 7,193,633 | B1 | | 3/2007 | Reinhardt et al. | |
| 2005/0089213 | A1 | * | 4/2005 | Geng | 382/154 |
| 2005/0128212 | A1 | | 6/2005 | Edecker et al. | |
| 2005/0212794 | A1 | | 9/2005 | Furukawa et al. | |
| 2005/0257748 | A1 | * | 11/2005 | Kriesel et al. | 119/51.02 |
| 2009/0010507 | A1 | * | 1/2009 | Geng | 382/128 |
| 2009/0141020 | A1 | | 6/2009 | Freund et al. | |
| 2009/0179895 | A1 | * | 7/2009 | Zhu et al. | 345/424 |
| 2009/0244062 | A1 | | 10/2009 | Steedly et al. | |
| 2010/0201682 | A1 | * | 8/2010 | Quan et al. | 345/419 |
| 2011/0096083 | A1 | | 4/2011 | Schultz | |
| 2011/0187716 | A1 | | 8/2011 | Chen et al. | |
| 2012/0120072 | A1 | * | 5/2012 | Se et al. | 345/420 |

OTHER PUBLICATIONS

"Efficient 3D reconstruction of large-scale urban environments from street-level video" by Gallup, David, Ph.D., The University of North Carolina at Chapel Hill, 2011.*
Charles R. Dyer, "Volumetric Scene Reconstruction from Multiple Views", Foundations of Image Understanding The Kluwer International Series in Engineering and Computer Science, 2001, vol. 628, 469-489.*
P Mordohai, et al. "Real-time video-based reconstruction of urban environments", Proceedings of 3DARCH: 3D Virtual Reconstruction, 2007.*
M. Pollefeys, et al. "Detailed Real-Time Urban 3D Reconstruction from Video", International Journal of Computer Vision vol. 78, No. 2-3 (2008), 143-167.*

(Continued)

*Primary Examiner* — Li Liu
(74) *Attorney, Agent, or Firm* — Sterne, Kessler, Goldstein & Fox PLLC

(57) ABSTRACT

In an embodiment, a method determines a three-dimensional model from a plurality of images taken of a geographic region by one or more cameras from different perspectives. The method includes determining, using a first stereo reconstruction technique: (i) a plurality of three-dimensional candidate surface points from the plurality of images, and (ii) which of the images in the plurality of images view each of the plurality of candidate surface points. The method also includes identifying an empty space between each of the plurality of candidate surface points and each camera model for the respective images determined to view the candidate surface point. The method further includes for each of a plurality of pairs of images from the plurality of images, determining, using a second stereo reconstruction technique, a surface estimate for the pair of images. The method also includes merging the surface estimates to identify a final surface.

21 Claims, 9 Drawing Sheets

OTHER PUBLICATIONS

Roy, Sébastien and Cox, Ingemar J., "A Maximum-Flow Formulation of the N-camera Stereo Correspondence Problem", *ICCV '98 Proceedings of the Sixth International Conference on Computer Vision*, 1998, pp. 492-499, IEEE Computer Society, Washington, DC USA.

Curless, Brian and Levoy, Marc, "A Volumetric Method for Building Complex Models from Range Images", *SIGGRAPH '96 Proceedings of the 23rd Annual Conference on Computer Graphics and Interactive Techniques*, 1996, pp. 303-312, ACM, New York, NY, USA.

Furukawa, Yasutaka and Ponce, Jean, "Patch-Based Multi-view Stereo Software (PMVS—Version 2)", *PMVS2, University of Washington, Department of Computer Science and Engineering*. Web. Downloaded from <http://grail.cs.washington.edu/software/pmvs/> on May 14, 2012.

Furukawa, Yasutaka and Ponce, Jean, "Accurate, Dense, and Robust Multi-View Stereopsis", *IEEE Transactions on Patten Analysis and Machine Intelligence*, Aug. 2010, vol. 32, No. 8, pp. 1362-1376, IEEE Computer Society, Washington, DC USA.

Scharstein, Daniel and Szeliski, Richard, "A Taxonomy and Evaluation of Dense Two-Frame Stereo Correspondence Algorithms", *International Journal of Computer Vision*, Apr.-Jun. 2002, vol. 47, No. 1-3, pp. 7-42, Kluwer Academic Publishers, Hingham, MA, USA.

F. Bernardini, I.M. Martin, and H. Rushmeier, "High-Quality Texture Reconstruction from Multiple Scans," IEEE Trans. Visualization and Computer Graphics, vol. 7, No. 4, pp. 318-332, Oct./Dec. 2001.

M. Goesele, B. Curless, and S. Seitz, "Multi-View Stereo Revisited," in Proc. IEEE Conf. Comput. Vis. Pattern Recognit., 2006, vol. 2, pp. 2402-2409.

C. Munkelt, M. Trummer, P. Kühmstedt, G. Notni, and J. Denzler, "View Planning for 3D Reconstruction Using Time-of-Flight Camera Data," in Proceedings of 31st DAGM Symposium (LNCS 5748), pp. 352-361, Springer-Verlag, Sep. 2009.

P. J. Narayanan, P. W. Rander, and T. Kanade, "Constructing Virtual Worlds Using Dense Stereo," in Proc. Sixth Int. Conf. on Computer Vision, pp. 3-10, 1998.

Izadi et al., "KinectFusion: Real-time 3D Reconstruction and Interaction Using a Moving Depth Camera," In Proc. UIST (2011), 10 pages.

\* cited by examiner

COMBINING NARROW-BASELINE AND WIDE-BASELINE STEREO FOR THREE-DIMENSIONAL MODELING

BACKGROUND

1. Field

Embodiments generally relate to three-dimensional modeling.

2. Related Art

Images may be captured of geographic areas. For example, a number of satellite or aerial photographs may form a view of downtown San Francisco. The photographs may contain images of buildings, trees, and other objects. Data may be extracted from the photographs to form an image.

Photographs can be taken from different perspectives. From the photographs, three-dimensional models may be constructed using, for example, stereo matching. Models constructed using stereo matching may not be entirely accurate. For example, inaccuracies may be introduced due to variations in the underlying images, inaccuracies in the camera perspective, and limitations of the stereo matching algorithms.

BRIEF SUMMARY

Embodiments determine a three-dimensional model from a plurality of digital photographic images taken of a geographic region by one or more cameras from different perspectives.

In an embodiment, a method for determining a three-dimensional model from a plurality of images taken of a geographic region by one or more cameras from different perspectives may include determining, using a first stereo reconstruction technique: (i) a plurality of three-dimensional candidate surface points from the plurality of images, and (ii) which of the images in the plurality of images view each of the plurality of candidate surface points. The method may also include identifying an empty space between each of the plurality of candidate surface points and each camera model for the respective images determined to view the candidate surface point.

The method may further include for each of a plurality of pairs of images from the plurality of images, determining, using a second stereo reconstruction technique, a surface estimate for the pair of images. Determining a surface estimate for the pair of images may include: (i) determining a likelihood of each point in a volume of interest being a surface point based on the empty space such that the likelihood of the point being a surface point is less when the point is inside the empty space than when the point is outside the empty space, and (ii) determining a surface estimate for the pair of images based on the likelihoods. A distance between positions of cameras used to generate the pair of images for the second stereo reconstruction technique is less than a distance between positions of cameras used to generate a pair of images used in the first stereo reconstruction technique. The method also includes merging the surface estimates to identify a final surface.

System and computer program product embodiments are also disclosed.

Further embodiments, features, and advantages of the invention as well as the structure and operation of the various embodiments of the invention are described in detail below with reference to accompanying drawings.

BRIEF DESCRIPTION OF THE FIGURES

The accompanying drawings, which are incorporated herein and form a part of the specification, illustrate embodiments of the present invention and, together with the description, further serve to explain the principles of the invention and to enable a person skilled in the pertinent art to make and use the invention.

Figure 1:
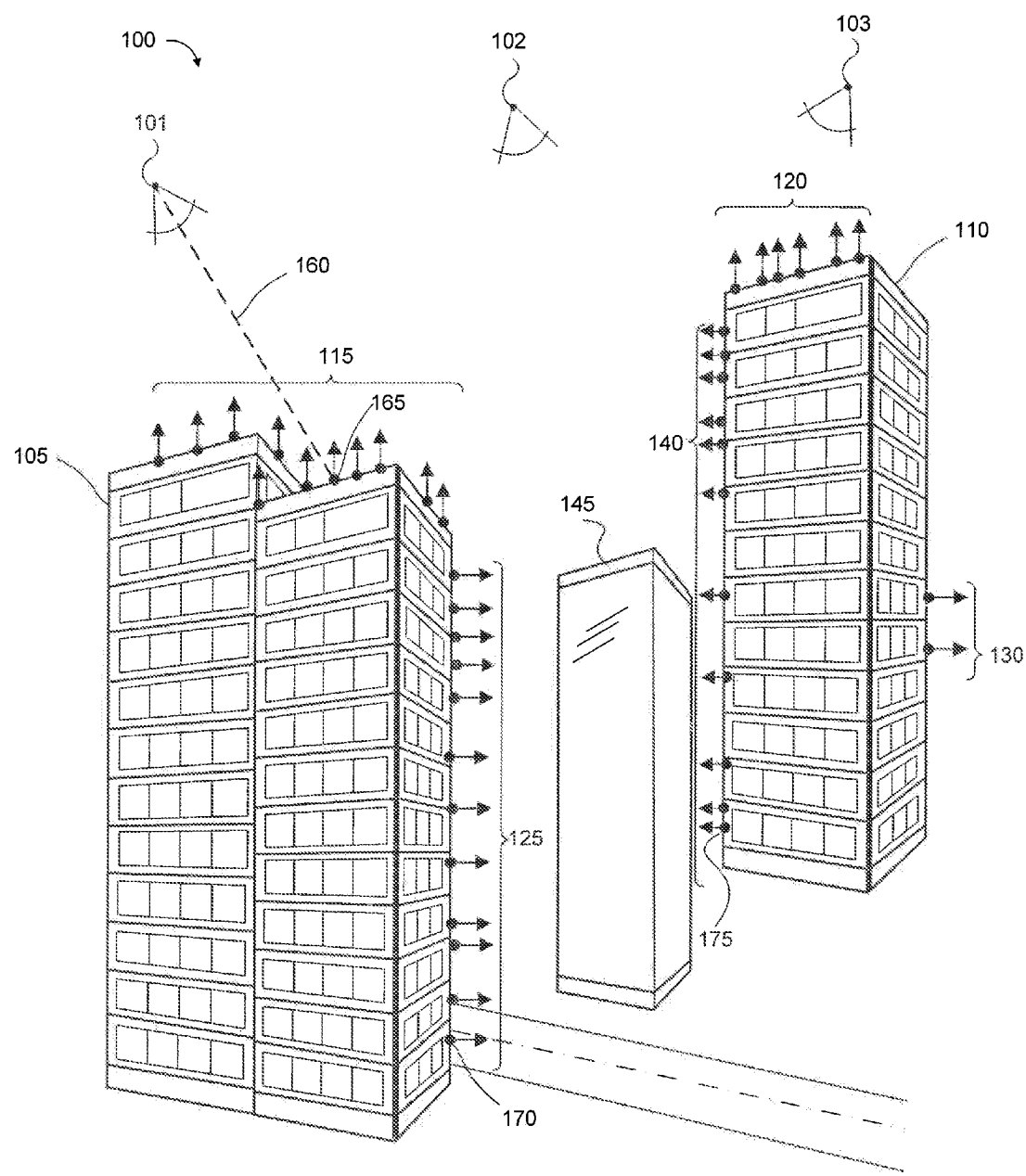
FIG. 1 is a diagram illustrating three-dimensional candidate surface points determined in a scene constructed from different viewpoints using a first stereo reconstruction technique, according to an embodiment.

Each diagram shown in the figures is an illustration and may not be drawn to scale.

The drawing in which an element first appears is typically indicated by the leftmost digit or digits in the corresponding reference number. In the drawings, like reference numbers may indicate identical or functionally similar elements.

DETAILED DESCRIPTION OF EMBODIMENTS

I. Overview
II. Application of Wide-baseline Stereo
  A. Candidate Surface Points
  B. Visibility of Candidate Surface Points
  C. Surface Normals of Candidate Surface Points
III. Reconstructing Surfaces Using a Second Stereo Reconstruction Technique
IV. Application of Narrow-baseline Stereo
  A. Volume of Interest
  B. Volumetric Representation of Surface Likelihood
  C. Surface Estimates
V. Identify a Final Surface
  A. Signed Distance Functions
  B. Merge Signed Distance Functions
VI. Example System
VII. Example Method
VIII. Example Computer Embodiment

I. Overview

Embodiments include techniques for three-dimensional modeling. A three-dimensional model may be determined from a plurality of images taken of a geographic region by one or more cameras from different perspectives. For example, three-dimensional models of cities may be reconstructed from an abundance of aerial imagery using computational stereo. Stereo matching finds points or surfaces that agree with the images. This agreement is called photo-consistency, and it may be computed by determining how well the images "line up" when projected onto the proposed surface. A surface of a three-dimensional model may then be reconstructed from the plurality of images.

Two stereo reconstruction algorithms are wide-baseline stereo and narrow-baseline stereo. A baseline may refer to a distance between the camera centers of the images that are used for the reconstruction. For narrow-baseline, a distance between positions of cameras used to generate the pair of images is less than the distance between the positions of cameras used for wide-baseline stereo.

Typically, either narrow-baseline or wide-baseline stereo has been applied to images to reconstruct surfaces, but not both. It may be advantageous to combine outputs of narrow-baseline stereo and wide-baseline stereo to obtain a more accurate reconstruction.

In an embodiment, surfaces may be reconstructed by first applying wide-baseline stereo to a plurality of images. An output of wide-baseline stereo may be a plurality of three-dimensional candidate surface points from the plurality of images. The wide-baseline stereo may further determine which of the images in the plurality of images view each of the plurality of candidate surface points. Between each of the plurality of candidate surface points and each camera model for the respective images determined to view the candidate surface point, an empty space may be identified.

Wide-baseline stereo may have inaccuracies. To mitigate these inaccuracies, narrow-baseline stereo may be applied to pairs of images to reconstruct surfaces. For each of a plurality of pairs of images, an output of narrow-baseline stereo may be a surface estimate for the pair of images. The surface estimate may be determined by determining a likelihood of each point in a volume of interest being a surface point based on the empty space. The likelihood of the point being a surface point may be less when the point is inside the empty space than when the point is outside the empty space. A surface point may refer to a point in an image that is a portion of a surface of an object.

Based on the determined likelihoods, the surface estimate for the pair of images may be determined. A distance between positions of cameras used to generate the pair of images for narrow-baseline stereo is less than a distance between positions of cameras used to generate a pair of images used in wide-baseline stereo. The narrow-baseline stereo provides a surface estimate for each pair of images. The surface estimates for each pair of images may be merged to identify a final surface. In this way, surfaces may be reconstructed using two different stereo reconstruction techniques.

For conciseness and convenience, this disclosure refers to reconstructing surfaces of buildings. It should be understood, however, that surfaces of other objects such as trees, mountains, and the like, may also be reconstructed.

In the detailed description that follows, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

II. Application of Wide-Baseline Stereo

Three-dimensional model data may be derived from a variety of sources including stereo imaging, computer-aided design (CAD) software, light detection and ranging (LIDAR), and/or a database identifying structures. A stereo reconstruction technique may be applied to a plurality of images taken of a geographic region by one or more cameras from different perspectives.

An example of a stereo reconstruction technique is wide-baseline stereo. Wide baseline stereo may be used to reconstruct buildings from the air. Images may be taken from multiple positions and angles from a camera source located in an aircraft. For example, images may be taken of buildings from an East, West, North, and South heading, and the images may be taken from positions hundreds of meters apart. Accordingly, the views of those buildings may be different in each image, and the same surface may be seen from different angles. The farther apart the images, the wider the geographic region that may be covered. Wide-baseline stereo includes images from different points of view and may be applied to the images simultaneously to reconstruct an entire scene. For example, wide-baseline stereo may be applied to 50-100 images simultaneously.

A. Candidate Surface Points

FIG. 1 is a diagram 100 illustrating three-dimensional candidate surface points determined in a scene constructed from different viewpoints using a first stereo reconstruction technique, according to an embodiment.

Diagram 100 includes camera sources 101, 102, and 103 and buildings 105, 110, and 145. Camera sources 101, 102, and 103 may take multiple images of geographic regions at various oblique or nadir perspectives. In an example, the images are oblique images of a geographic area. In the imagery, features are detected and correlated with one another. Three-dimensional data points may be generated from the aerially acquired images and camera calibrations. Using the known perspective information, points in three-dimensional space are triangulated from matched features. In this way, three-dimensional model information may be determined from two-dimensional imagery.

The first stereo reconstruction technique may be wide-baseline stereo. In an embodiment, using wide-baseline stereo, a plurality of three-dimensional candidate surface points may be determined from the plurality of images. In an example, wide-baseline stereo determines a dense three-dimensional candidate surface point cloud of a geographic region.

Diagram 100 includes a plurality of three-dimensional candidate surface points 115, 120, 125, 130, and 140 of buildings 105, 110, and 145 determined from a plurality of images taken of a geographic region by camera sources 101, 102, and 103. The determined plurality of candidate surface points may be three-dimensional points having a high likelihood of representing points on a surface.

Methods and techniques to perform wide-baseline stereo are known to a person of ordinary skill in the relevant art. An example algorithm is Patch-based Multi-View Stereo (PMVS). Based on the description herein, a person of ordinary skill in the relevant art will recognize that other algorithms may be used.

B. Visibility of Candidate Surface Points

For one or more candidate surface points, a visibility of the candidate surface point in an image taken by a camera may be determined. If the candidate surface point is visible in the image based on a perspective of the camera that took the image, the candidate surface point is considered visible. In another image, however, the candidate surface point may be occluded by another object based on a different perspective of the camera that took the image. If the candidate surface point is not visible in the image based on the perspective of the camera that took the image, the candidate surface point is considered not visible. Each of the candidate surface points may be associated with a list of images in which that respective candidate surface point is visible.

In an embodiment, an empty space between each of the plurality of candidate surface points and each camera model for the respective images determined to view the candidate surface point is identified. The space between a candidate surface point and a camera model for an image determined to view the candidate surface point has a high likelihood of being empty space. As such, it may be determined with a high degree of certainty that all of the points on a line from a visible camera center to the visible point are empty.

For example, in diagram 100, a line segment 160 extends from camera 101 to a candidate surface point 165. Candidate surface point 165 is in the plurality of three-dimensional candidate surface points 115. The points on line segment 160 have a low likelihood of being surface points and may be determined to be empty space. Points within a predetermined radius of line segment 160 may also have a low likelihood of being surface points. In an embodiment, wide-baseline stereo provides visibility rays indicating the empty space as output, and the empty space may be identified by identifying the visibility rays.

Identifying the empty space may be useful in performing a full reconstruction of the scene. More details on this are below.

C. Surface Normals of Candidate Surface Points

One or more candidate surface points may have a normal vector at a surface of the candidate surface point's location. A normal vector can come, for example, from a tool that is used to generate the three-dimensional data set from images.

In an embodiment, for each candidate surface point, a surface normal is determined. A surface normal at a candidate surface point is directed perpendicular to a surface at the candidate surface point. In diagram 100, surface normals are shown for each of the candidate surface points as arrows pointing in a direction that is perpendicular to the surface at the candidate surface point.

In an example, candidate surface point 165 is located on the roof of building 105. An arrow extends from candidate surface point 165 in a direction perpendicular to the roof of building 105. In another example, candidate surface point 175 is located on a side of building 110. An arrow extends from candidate surface point 175 in a direction perpendicular to the side of building 110.

More details on the surface normals of candidate surface points are below.

III. Reconstructing Surfaces Using a Second Stereo Reconstruction Technique

Wide-baseline stereo may have advantages of high accuracy and fully integrated reconstruction. Wide-baseline stereo, however, may require precise calibration and may have difficult occlusion handling.

Further, wide-baseline stereo is typically conservative. Wide-baseline stereo may have difficulty in producing candidate surface points in images that include objects or elements having reflective properties (e.g., water or glass) or in images that include occluded objects (e.g., a street occluded by buildings from different angles). For example, in FIG. 1, wide-baseline stereo may not determine candidate surface points on glass building 145 due to the difficulty in identifying a visible surface in the plurality of images taken by, for example, cameras 101, 102, and 103. This difficulty may be because glass has a different appearance from different angles, and thus would have a different appearance in different images and leading to inconsistent results for wide-baseline stereo. Also, the difficulty may be because the surface lacks enough distinctive features. Accordingly, wide-baseline stereo may skip over these points and not output them as candidate surface points.

If a likelihood of a three-dimensional point being a surface point at a location does not satisfy a threshold, wide-baseline stereo will not produce any three-dimensional points at that location. This may result in holes or missing regions. Here, a second stereo reconstruction technique may be used to complement wide-baseline stereo to fix these missing regions that may or may not include surface points.

The results from wide-baseline stereo may be used to initialize the second stereo reconstruction technique. In an embodiment, the second stereo reconstruction technique is narrow-baseline stereo. Narrow-baseline stereo may have advantages of being less sensitive to calibration errors, and relative calibration between nearby pairs may be quite accurate.

Wide-baseline stereo starts from highly confident seed points and grows the surface as much as possible, without requiring volume of interest bounds. The wide-baseline points may in turn be used to give tight bounds on the volume of interest for narrow-baseline stereo. Defining the volume of interest may be non-trivial. Overestimating the volume of interest, for example, may lead to unnecessary computation time and memory or reduced precision.

Narrow-baseline stereo may use only a pair of nearby images that are taken close to each other. Narrow-baseline stereo images may be captured by the same camera taking photographs rapidly at approximately the same point in time. The images are typically captured within seconds of each other, meaning that the appearance remains constant making photo-consistency computation easier. Also, occlusions are less severe, and most surfaces are visible in both images. The two images may be roughly the same because there is not a lot of variation in the view point of the camera. For example, the lighting remains consistent and occlusions are more unlikely compared to wide-baseline stereo. Accordingly, there is a higher certainty that points on the surface will look the same in two different photographs. Thus matching the points may be relatively easier using narrow-baseline stereo compared to wide-baseline stereo.

Complementing wide-baseline stereo with narrow-baseline stereo may avoid mistakes such as determining that the space between two buildings in an image is solid when it is not. For example, one or more cameras may capture images of two buildings at an angle such that the street is not visible in some of the images and visible in some other images. Because of the inconsistency, wide-baseline stereo may ignore the street surfaces and not reconstruct them. A pair of narrow-baseline stereo images, however, may view some points along the street, and narrow-baseline may reconstruct the street surface.

In another example, wide-baseline stereo may have poor quality matches on glassy surfaces but with enough information from the surrounding surfaces, narrow-baseline stereo may be able to pick up on a weak indication of surface points and fill in the surface points accordingly.

The disparity of a point in narrow-baseline stereo is smaller than the disparity of a point in wide-baseline stereo. A disparity may refer to a difference in pixel coordinates of a particular point in each image. In other words, the disparity may refer to how much that point moves in one image to the next image. The motion of points in the images is smaller in narrow-baseline stereo compared to wide-baseline stereo.

In narrow-baseline stereo, the disparity of a particular point included in two images may be small (e.g., within 10 percent of a size or a width of the image). For example, if an image includes 1000×1000 pixels and the disparity of a particular point within the two images is 100 pixels of motion or less, narrow-baseline stereo may be applied to the pair of images.

In contrast, in wide-baseline stereo, the disparity of a particular point included in two images is larger compared to narrow-baseline stereo. For example, a typical range for the disparity for wide-baseline stereo may be fifty percent or more of the image. In another example, the disparity may be between ten to fifty percent. In this example, the image may be in a grey area.

The narrow-baseline stereo algorithm and wide-baseline stereo algorithm may be defined depending on whether the narrow-baseline algorithm or wide-baseline algorithm is applied between the images and whether the applied algorithm works for the images. For example, narrow-baseline stereo may be considered to work if the algorithm recovers depth with approximately 90 percent accuracy. Wide-baseline stereo may be applied to the images if narrow-baseline stereo fails.

IV. Application of Narrow-Baseline Stereo

Figure 2:
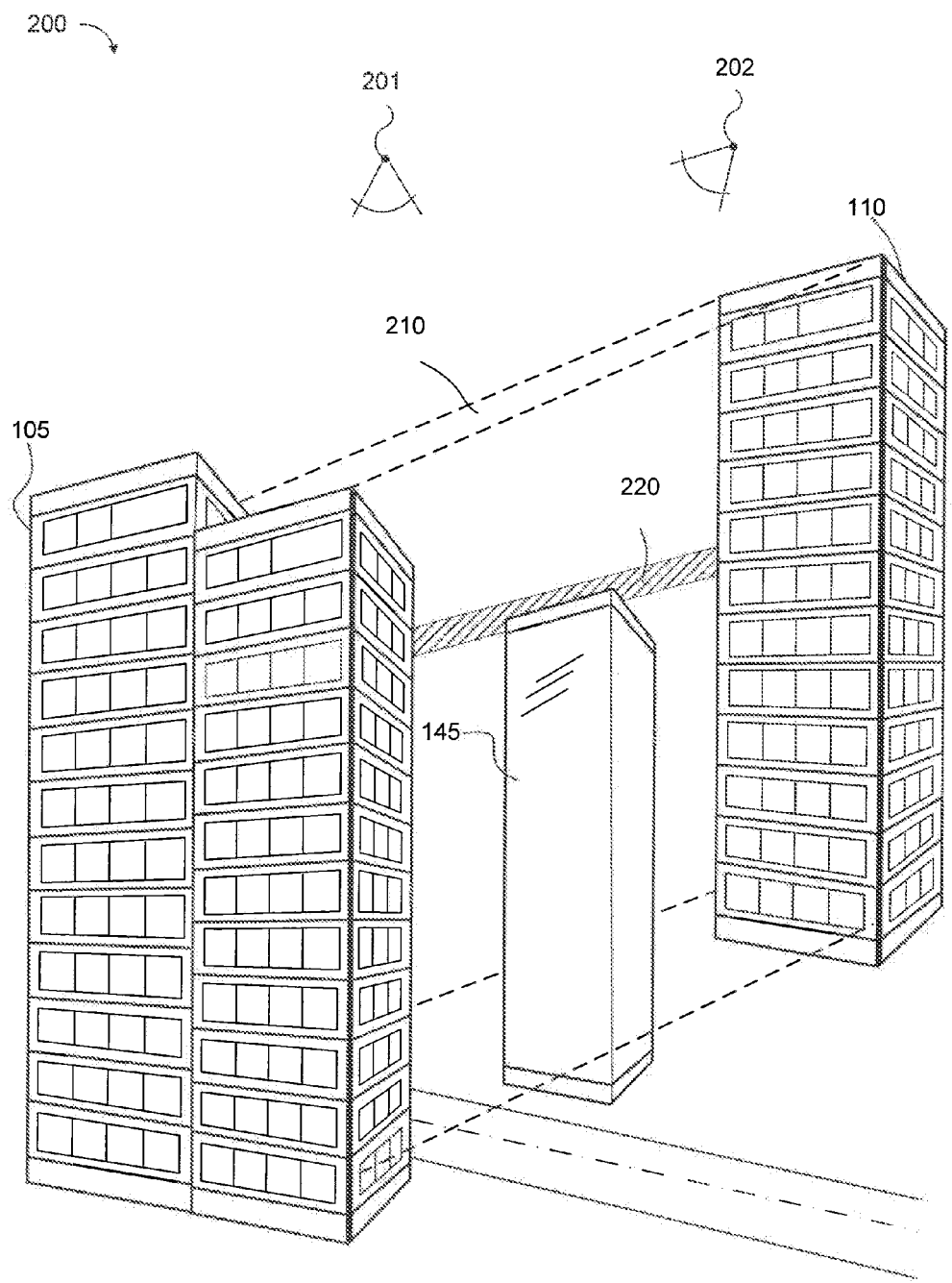
FIG. 2 is a diagram illustrating three-dimensional candidate surface points determined in a scene constructed from a pair of images using a second stereo reconstruction technique, according to an embodiment.

FIG. 2 is a diagram 200 illustrating three-dimensional candidate surface points determined in a scene constructed from a pair of images using a second stereo reconstruction technique, according to an embodiment.

Diagram 200 includes camera sources 201 and 202, and buildings 105, 110, and 145. Camera sources 201 and 202 may be the same camera source taking images of a geographic region at different points in time or may be different sources taking images of a geographic region. The second stereo reconstruction technique may be applied to images taken by camera sources 201 and 202.

The second stereo reconstruction technique may be narrow-baseline stereo. In an embodiment, using narrow-baseline stereo, for each of a plurality of pairs of images from a plurality of images, a surface estimate for the pair of images may be determined. Determining the surface estimate for the pair of images may include determining a likelihood of each point in a volume of interest being a surface point and determining a surface estimate for the pair of images based on the determined likelihoods.

A. Volume of Interest

The candidate surface points determined using wide-baseline stereo may indicate a volume of interest through which narrow-baseline stereo may be applied to determine a surface estimate. In an example, narrow-baseline stereo is applied to the volume of interest to search for surfaces. Using wide-baseline stereo to determine a bounded volume of interest in which to apply narrow-baseline stereo may save time and processing power because narrow-baseline stereo can be expensive.

The volume of interest may include locations of candidate surface points. For example, the volume of interest may include locations of candidate surface points indicating a high likelihood of surface. For example, narrow-baseline stereo may be applied to an area including plurality of candidate surface points 115, 120, 125, 130, and 140. The surfaces determined using wide-baseline stereo may be reconstructed using narrow-baseline stereo.

The volume of interest may also include locations of candidate surface points indicating the potential existence of surface. In an example, wide-baseline stereo determines candidate surface points from buildings that are hundreds of meters high (e.g., at an elevation of 250 meters) down to the ground. For example, referring back to FIG. 1 wide-baseline stereo may determine candidate surface points indicating a bottom and top of buildings 105 and 110. Wide-baseline stereo may not determine candidate surface points along glass building 145 because it appears differently in the images and the wide baseline stereo algorithm is unable to obtain a consistent reading. Accordingly, wide-baseline stereo may determine candidate surface points on buildings 105 and 110 and not on glass building 145.

In FIG. 2, a volume of interest 210 may be identified, and narrow-baseline stereo may be applied to volume of interest 210. Volume of interest 210 may be bounded by a bottom and top of buildings 105 and 110, and narrow-baseline stereo may be constricted within this range. Narrow-baseline stereo may sweep from a location of a lowest determined candidate surface point on building 105 (e.g., candidate surface point 170) to a lowest determined candidate surface point on building 110 (e.g., candidate surface point 175) up to a top of buildings 105 and 110.

B. Volumetric Representation of Surface Likelihood

Narrow-baseline stereo may search for surfaces in volume of interest 210. In an embodiment, a likelihood of each point in volume of interest 210 being a surface point is determined. Accordingly, photo-consistency may be computed for each point in volume of interest 210. For one or more points in the volume of interest, photo consistency measurements may be determined based on computing a matching score to determine a likelihood of a particular point being a surface point. The volumetric representation of a likelihood of points in the volume of interest being surface points may be referred to as a photo consistency volume or a cost volume.

Narrow-baseline stereo may use a plane-sweep approach to compute photo-consistency for each point in the volume of interest. A photo-consistency score may indicate the photo-consistency of the point. The narrow-baseline stereo algorithm may sweep within this range. In an embodiment, determining a likelihood of each point in a volume of interest being a surface point includes determining a plane including a point in the volume of interest and projecting images determined to view the point onto the plane. As an example, narrow-baseline stereo may sweep a plane 220 through a space (e.g., volume of interest 210), and as narrow-baseline stereo sweeps plane 220, each point in the space may be tested to determine a likelihood of the plane being a surface. Plane 220 may be, for example, 100 meters above the ground. Narrow-baseline stereo may determine a likelihood of a surface matching that plane. To determine whether the plane includes a surface, all of the images may be projected onto that plane. If the plane intersects a building roof and the plane is a good approximation of the building roof, the images may match up at that point.

The likelihood of the point being a surface point may depend on various factors such as how well that point matches in the images as a surface hypothesis. For example, if the point is in the middle of the air, the likelihood of the point being a surface point may be high if a majority of the imagery passing through that point has roughly the same appearance. Accordingly, the point may be a good estimate of a surface point. If this is not true and imagery passing through that point does not have roughly the same appearance, then the likelihood of the point being a surface point may be low. Accordingly, the point may be a bad estimate of a surface point.

The volumetric volume may be improved by incorporating the empty space identified using wide-baseline stereo. As discussed, points along a line segment between each of a plurality of candidate surface points and each camera model for the respective images determined to view the candidate surface point may be identified as having a low likelihood of being a surface point. These points along the line segment may be identified as empty space. The likelihood of a point in volume of interest 210 being a surface point may be based on the empty space. In an example, the likelihood of the point being a surface point may be reduced when the point is inside the empty space compared to when the point is outside the empty space. In an example, the likelihood of the point being a surface point may be less when the point is inside the empty space than when the point is outside the empty space.

In an embodiment, the likelihood of each point in volume of interest 210 being a surface point is represented as a voxel grid. Each voxel in the voxel grid may have an associated position in three-dimensional space. The voxel grid may include the likelihood of each point in the volume of interest being a surface point and may further incorporate knowledge about the empty space. The surface likelihood of voxels that intersect a line segment between a candidate surface point and each camera model for the respective images determined to view the candidate surface point may be reduced. For example, the voxel grid may include the empty space such that the likelihood of the point being a surface point is less when the point is inside the empty space compared to when the point is outside the empty space. Storing a huge volume of photo consistency measurements may consume a lot of memory.

C. Surface Estimates

Wide-baseline stereo may be performed on a plurality of images simultaneously.

In contrast, narrow-baseline stereo may be performed on a pair of nearby images. Narrow-baseline stereo produces a surface estimate for every image pair. The surface estimate may be determined by identifying a minimal surface area that passes through all of the high likelihood photo-consistency points. The image pair may be a view of a surface from substantially the same point of view. The point of view is slightly different, and a surface estimate may be reconstructed from substantially the same point of view.

In an embodiment, for the pair of narrow-baseline images, a graph-cut technique is used to compute a smooth surface that passes through the most photo-consistent points, separating solid space from empty space. The wide-baseline points may be used to augment the graph weights such that the surface is more likely to pass through the candidate surface points having a high likelihood of being surface points and to not pass through the empty space between points and camera centers.

In an embodiment, a surface estimate for the pair of images may be determined by identifying points having a likelihood of being a surface point that matches a threshold. In an example, the three-dimensional points included in the empty space do not satisfy the threshold. In another example, a surface estimate may be determined by augmenting graph weights such that the surface estimate passes through points that satisfy the threshold and does not pass through the empty space.

V. Identify a Final Surface

After the surface estimates for each pair of images have been reconstructed, the surface estimates may be merged to determine a final surface. The narrow-baseline surfaces estimates are not a unified reconstruction because one reconstruction is performed of a scene for every pair of nearby images, and they may not necessarily agree. To produce a single unified surface of a three-dimensional model, the surface estimates for every image pair may be merged to form a final surface. The final surface may be a representation of the geographic area.

The wide-baseline candidate surface points may also be used to form the final surface. The final surface reconstructed from narrow-baseline stereo may be merged with the surfaces reconstructed from wide-baseline stereo. A piece of surface may be reconstructed from wide-baseline stereo candidate points because the points also have surface normals that may be used to reconstruct the surface.

A. Signed Distance Functions

After constructing the surfaces, a signed distance function may be determined. A signed distance function may be determined by determining a distance value between a point in the volumetric representation and a surface. Each point in the volumetric representation may be associated with a shortest distance value. For example, if the volumetric representation is a voxel grid, the distance value may represent a shortest distance between a voxel in the voxel grid and a surface. For each inputted voxel, the distance is measured along a perspective associated with the surface of the three-dimensional model. More specifically, the distance may be measured along a ray from the voxel directly towards or directly away from the virtual camera.

The distance may be a signed distance value, meaning its magnitude (absolute value) may be the distance between a point and a surface, but it may also be positive or negative. For example, the determined distance value may be positive to indicate that the voxel is located above the surface from the perspective of the virtual camera, and the determined distance value in the negative indicates the voxel is located below the surface from the perspective of the virtual camera.

Figure 3:
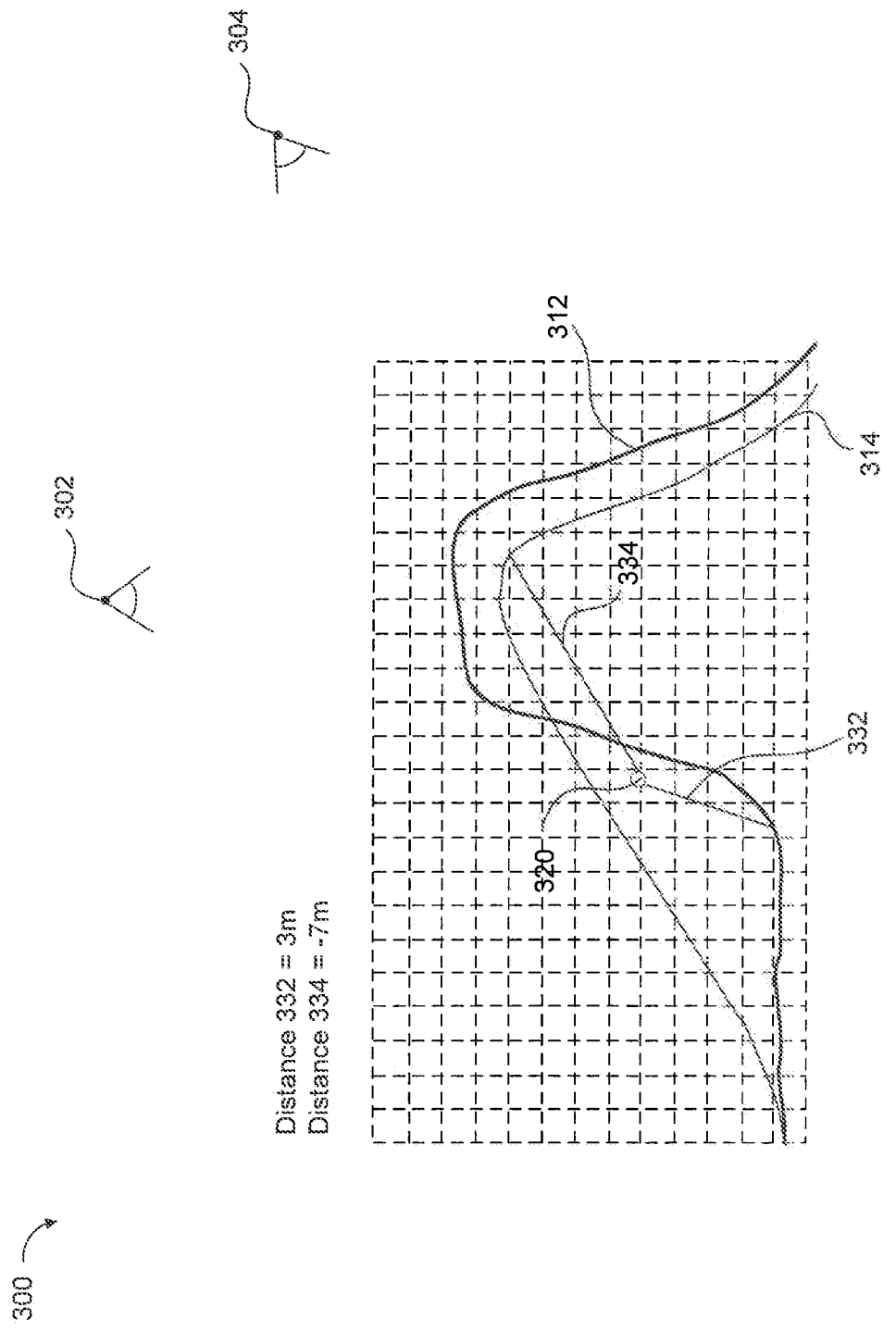
FIG. 3 is a diagram illustrating various distance measurements using a voxel grid, according to an embodiment.

FIG. 3 is a diagram 300 illustrating various distance measurements using a voxel grid, according to an embodiment. Diagram 300 shows surfaces of three-dimensional models 312 and 314 having corresponding virtual cameras 302 and 304. Distance values for each of the three-dimensional models may be generated for a voxel 320. In particular, diagram 300 shows a distance 332 for model 312 and a distance 334 for model 314. As illustrated in diagram 300, distance 332 is measured as 3 m, meaning voxel 320 is 3 meters above surface 312, and distance 334 is measured as −7 m, meaning voxel 320 is 7 meters below surface 314.

If the volumetric representation of a likelihood of each point in a volume of interest being a surface point is represented as a voxel grid, a signed distance function may be constructed from a narrow-baseline surface estimate by determining a voxel in the voxel grid and a shortest distance from the voxel to the surface estimate. These signed distance functions may be merged to identify a final surface. More details on this are below.

Figure 4:
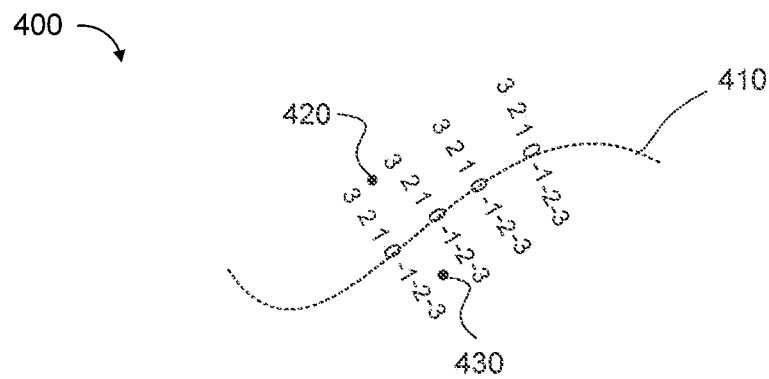
FIG. 4 is a diagram illustrating a signed distance function for a narrow-baseline surface estimate, according to an embodiment.

FIG. 4 is a diagram 400 illustrating a signed distance function for a narrow-baseline surface estimate 410, according to an embodiment. Surface estimate 410 is an example of a surface estimate determined for a pair of narrow-baseline images. Diagram 400 shows distance measurements from surface estimate 410. For example, a point 420 is about +3 meters from surface estimate 410 and is 3 meters above surface estimate 410, and a point 430 is about −2 meters from surface estimate 410 and is 2 meters below surface estimate 410. Points that have a distance value of 0 from surface estimate 410 are surface points located on surface estimate 410.

Figure 5:
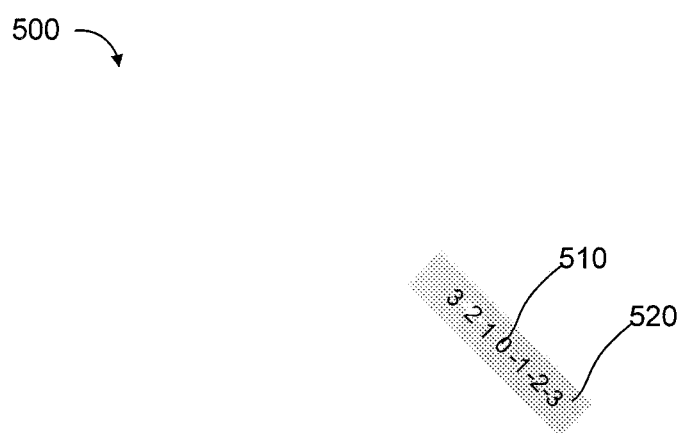
FIG. 5 is a diagram illustrating a signed distance function for a wide-baseline candidate surface point, according to an embodiment.

FIG. 5 is a diagram 500 illustrating a signed distance function for a wide-baseline candidate surface point 510, according to an embodiment. In diagram 500, the voxels located around candidate surface point 510 are shown within an area 520. Voxels within area 520 may be in front and behind candidate surface point 510. A signed distance function may be computed for candidate surface point 510 based on candidate surface point 510 and the voxels located around candidate surface point 510. In this way, each candidate surface point may provide a partial signed distance function.

Each of the candidate surface points determined using wide-baseline stereo can be thought of as a partial signed distance function. At each point, a partial surface can be constructed based on the surface normal of the point. In an example, if a surface normal of a candidate surface point points up, the voxels in a column above and below that point may be an input to create a signed distance function for that column and may be added to the overall volume to determine a total signed distance function.

B. Merge Signed Distance Functions

In an embodiment, surface estimates are merged to determine a final surface using signed distance functions.

In an example, narrow-baseline surface estimates for each image pair may be merged using signed distance functions. In narrow-baseline stereo, each image pair may produce surface estimates of a scene, and these surface estimates may be merged to obtain a final surface for an object in the scene. In an example, the signed distance functions for each narrow-baseline surface estimate may be merged to determine a total signed distance function. The total signed distance function may indicate a final surface of an object.

Figure 6:
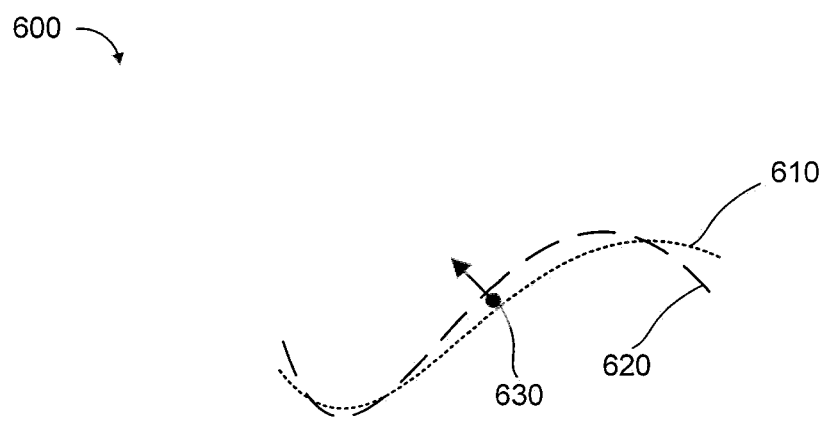
FIG. 6 is a diagram illustrating a candidate surface point for wide-baseline stereo and estimated surfaces for narrow-baseline stereo, according to an embodiment.

FIG. 6 is a diagram 600 illustrating a candidate surface point for wide-baseline stereo and estimated surfaces for narrow-baseline stereo, according to an embodiment. Diagram 600 illustrates estimated surfaces 610 and 620. Estimated surface 610 may be determined for a first pair of images, and estimated surface 620 may be determined for a second pair of images different from the first pair of images.

Diagram 600 also illustrates a candidate surface point 630 and its normal from wide-baseline reconstruction. A distance between positions of cameras used to generate the first or second pair of images for narrow-baseline stereo is less than a distance between positions of cameras used to generate a pair of images used in wide-baseline stereo.

The narrow-baseline surface estimates may be integrated to determine a final surface. In an embodiment, the surfaces from narrow-baseline are integrated into one unified signed distance function framework.

The wide-baseline candidate surface points may also be merged with the narrow-baseline surface estimates to determine a final surface. For example, in an embodiment, the surfaces from narrow-baseline and candidate surface points from wide-baseline stereo are integrated into one unified signed distance function framework. In an embodiment, a surface normal for each of the plurality of wide-baseline candidate surface points is determined, and a surface estimate for each of the plurality of candidate surface points is determined based on the surface normal. A signed distance function for each of the surface estimates may be determined. These signed distance functions may be merged with the signed distance functions determined based on narrow-baseline stereo.

Figure 7:
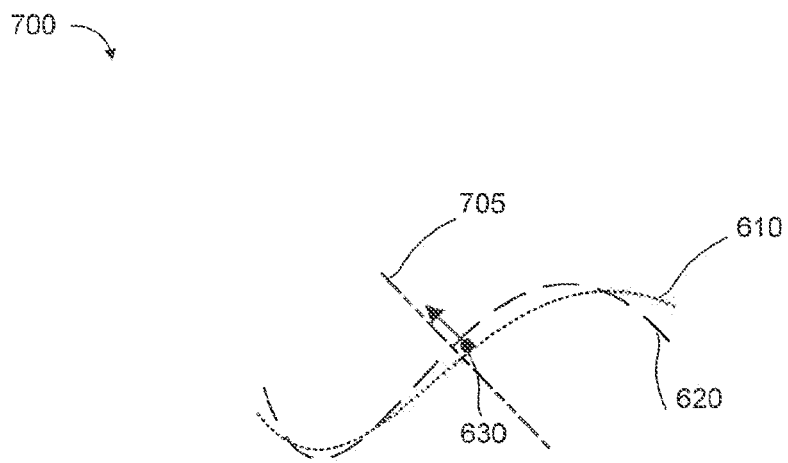
FIG. 7 is a diagram illustrating estimated surfaces, a candidate surface point, and a cross section for which a signed distance function may be determined, according to an embodiment.

FIG. 7 is a diagram 700 illustrating estimated surfaces 610 and 620, candidate surface point 630, and a cross section 705 for which a signed distance function may be determined, according to an embodiment. Cross section 705 represents a one-dimensional function of the signed distance function along that curve.

Figure 8:
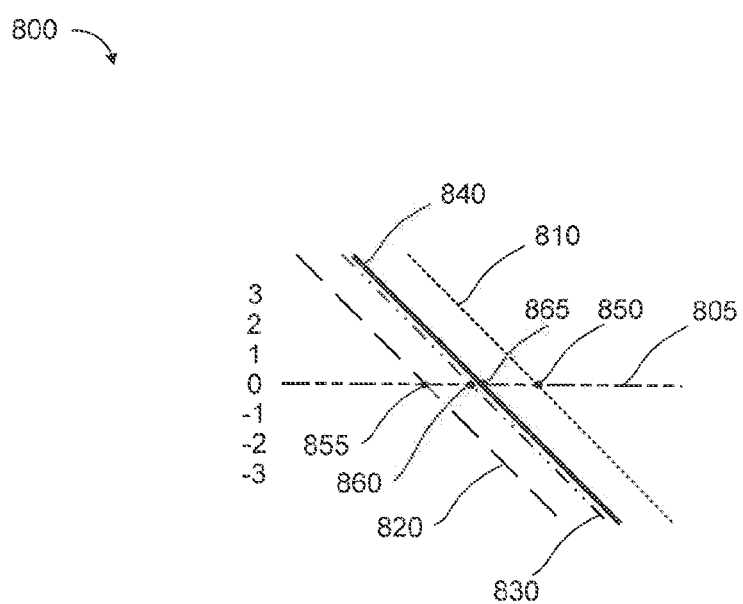
FIG. 8 is a diagram illustrating an average signed distance function for the cross section in FIG. 7, the average signed distance function indicating a point on a final surface of a three-dimensional model, according to an embodiment.

FIG. 8 is a diagram 800 illustrating an average signed distance function 840 for cross section 805, according to an embodiment.

Diagram 800 illustrates line segments 810, 820, and 830. Line segment 810 is a signed distance function for surface estimate 610 along cross section 705, line 820 is a signed distance function for surface estimate 620 along cross section 705, and line 830 is a signed distance function for candidate surface point 630 along cross section 705.

Each of line segments 810, 820, and 830 intersects with cross section 805, and points on cross section 805 may correspond to points on cross section 705. For example, line segment 810 intersects with cross section 805 at a point 850, and point 850 corresponds to a point at which surface estimate 610 intersects with cross section 705 in FIG. 7. Line segment 820 intersects with cross section 805 at a point 855, and point 855 corresponds to a point at which surface estimate 620 intersects with cross section 705 in FIG. 7. Line segment 830 intersects with cross section 805 at a point 860, and point 860 corresponds to a point at which surface estimate 630 intersects with cross section 705 in FIG. 7.

For a point on cross section 805, it may be determined how far the point is from a particular surface. In an embodiment, the portions of line segments 810, 820, and 830 that are above cross section 805 indicate a distance in the positive direction, away from the surface and into the empty space. Similarly, the portions of line segments 810, 820, and 830 that are below cross section 805 indicate a distance in the negative direction, below the surface.

In another embodiment, the portions of line segments 810, 820, and 830 that are above cross section 805 indicate a distance in the positive direction, below the surface. Similarly, the portions of line segments 810, 820, and 830 that are below cross section 805 indicate a distance in the negative direction, away from the surface and into the empty space.

A zero-crossing may refer to a location at which a signed distance function crosses zero or is equal to zero. This location may also be referred to as being zero-distance from the surface. The zero-crossing may indicate a point on a surface.

For example, point 850 on cross section 805 is zero-distance from surface estimate 610 and represents a surface point on surface estimate 610, point 855 on cross section 805 is zero-distance from surface estimate 620 and represents a surface point on surface estimate 620, and point 860 on cross section 805 is zero-distance from surface estimate 630 and represents a surface point on candidate surface point 610 or its normal.

Line segments 810, 820, and 830 are different and may be merged to determine a line segment 840. Line segment 840 is an average signed distance function based on line segments 810, 820, and 830. Line segment 840 may indicate a point on a final surface of a three-dimensional model. In an example, the zero-crossing of line segment 840 may indicate a point on the final surface of a three-dimensional model. Line segment 840 intersects with cross section 805 at a point 865, and point 865 indicates a point on a final surface of a three-dimensional model. When the three-dimensional model is displayed to a user, point 865 may be displayed.

The final surface may be extracted as the zero-distance isosurface of the final signed distance function. Cross section 805 passes through the final surface and may be approximately perpendicular to the final surface.

The signed distance functions may be merged by applying an algorithm that integrates the signed distance functions together. An example signed distance function is Volumetric Range Image Processing (VRIP) style meshing algorithm. VRIP integrates the signed distance functions for every input surface, and averages the signed distance functions in locations where there are a lot of surfaces. The final surface is then extracted as the zero-distance isosurface of the final signed distance function. The signed distance function for each narrow-baseline surface and each wide-baseline point may be computed as described by the VRIP algorithm. The weighting may be changed slightly to place greater confidence on the distance values along the viewing rays of the images where the surface distance is measured directly.

Based on the total signed distance function, a final surface may be extracted from the voxel grid by determining at every point in the voxel grid a zero distance iso-surface. The points having a distance value of 0 in the voxel grid are determined to be a final surface of an object.

A total signed distance function may include the sum of each signed distance function from the narrow-baseline stereo results and the signed distance functions from the candidate surface points from the wide-baseline stereo. This may result in high-fidelity, wide-area city models that can be used to view a geographic region.

In diagram 800, the final surface is identified by merging a candidate surface point and estimated surfaces.

In another embodiment, the final surface is identified by merging only estimated surfaces, in this embodiment, the final surface does not include candidate surface points. This may be because candidate surface points are sparse.

VI. Example System

Figure 9:
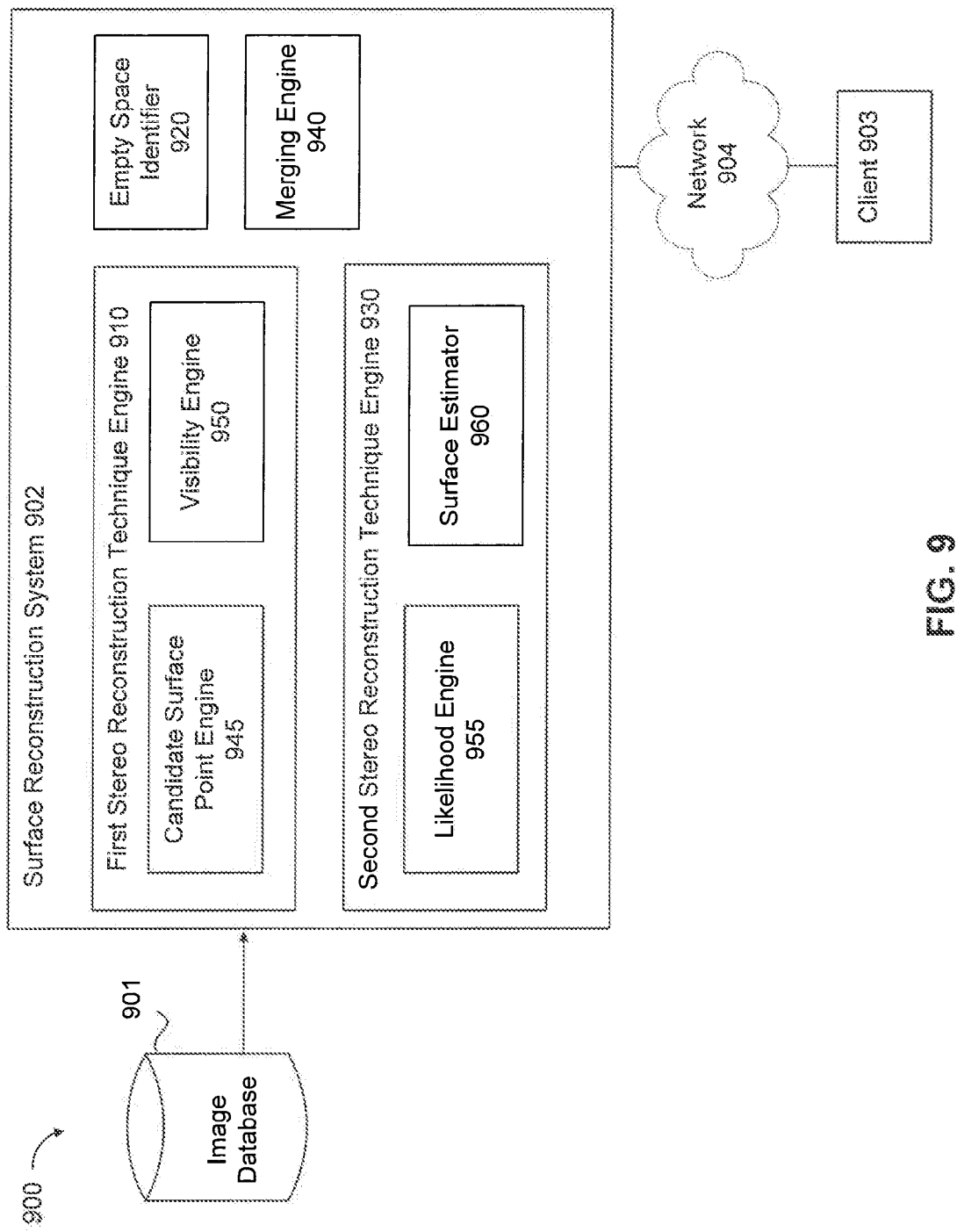
FIG. 9 is a diagram illustrating a system for determining a final surface for a three-dimensional model using two different stereo reconstruction techniques, according to an embodiment.

FIG. 9 is a diagram illustrating a system 900 for determining a final surface for a three-dimensional model using two different stereo reconstruction techniques, according to an embodiment. System 900 may apply a first stereo reconstruction technique and a second stereo reconstruction technique to a plurality of images. The first stereo reconstruction technique is different from the second stereo reconstruction technique.

System 900 includes an image database 901 and a surface reconstruction system 902. Surface reconstruction system 902 is coupled to a client 903 over a network 904.

Image database 901 includes images taken of a geographic region by one or more cameras from different perspectives. A three-dimensional model may be determined from a plurality of images taken of a geographic region by one or more cameras from different perspectives. A first stereo reconstruction technique and a second stereo reconstruction technique may be applied to the images.

Surface reconstruction system 902 includes a first stereo reconstruction technique engine 910, an empty space identifier 920, a second stereo reconstruction technique engine 930, and a merging engine 940.

First stereo reconstruction technique engine 910 may take as input a plurality of images and apply a first stereo reconstruction technique to the plurality of images. First stereo reconstruction technique engine 910 includes a candidate surface point engine 945 and a visibility engine 950. Candidate surface point engine 945 determines, using a first stereo reconstruction technique, a plurality of three-dimensional candidate surface points from the plurality of images. Visibility engine 950 determines, using the first stereo reconstruction technique, which of the images in the plurality of images view each of the plurality of candidate surface points.

Empty space identifier 920 identifies an empty space between each of the plurality of candidate surface points and each camera model for the respective images determined by visibility engine 950 to view the candidate surface point.

Second stereo reconstruction technique engine 930 may take as input a pair of images from the plurality of images and apply a second stereo reconstruction technique to the pair of images. A distance between positions of cameras used to generate the pair of images for the second stereo reconstruction technique is less than a distance between positions of cameras used to generate a pair of images used in the first stereo reconstruction technique. For each of a plurality of pairs of images from the plurality of images, second stereo reconstruction technique engine 930 determines, using a second stereo reconstruction technique, a surface estimate for the pair of images.

Second stereo reconstruction technique engine 930 includes a likelihood engine 955 and a surface estimator 960. To determine the surface estimate for the pair of images, likelihood engine 955 determines a likelihood of each point in a volume of interest being a surface point based on the empty space determined by empty space identifier 920. The likelihood of the point being a surface point may be less when the point is inside the empty space than when the point is outside the empty space. Likelihood engine 955 determines a surface estimate for the pair of images based on the determined likelihoods.

In an embodiment, merging engine 940 merges the surface estimates determined by second stereo reconstruction technique engine 930. For example, merging engine 940 may merge the surface estimates determined by surface estimator 960 to identify a final surface.

In an embodiment, merging engine 940 merges the surface estimates determined by first stereo reconstruction technique engine 910 and second stereo reconstruction technique engine 930. For example, candidate surface point engine 945 may determine a surface estimate of a candidate surface point based on the candidate surface point and its surface normal. Merging engine 940 may merge the surface estimates determined by surface estimator 960 and by candidate surface point engine 945 to identify a final surface.

Surface reconstruction system 902 may send an image including the final surface to client 903 for display to a user.

Surface reconstruction system 902 and client 903 may be implemented on any computing device. Such computing device can include, but is not limited to, a personal computer, mobile device such as a mobile phone, workstation, embedded system, game console, television, set-top box, or any other computing device. Further, a computing device can include, but is not limited to, a device having a processor and memory for executing and storing instructions. Software may include one or more applications and an operating system. Hardware can include, but is not limited to, a processor, memory and graphical user interface display. The computing device may also have multiple processors and multiple shared or separate memory components. For example, the computing device may be a clustered computing environment or server farm.

Each of empty space identifier 920, merging engine 940, candidate surface point engine 945, visibility engine 950, likelihood engine 955, and surface estimator 960 may be implemented in hardware, software, firmware, or any combination thereof.

VII. Example Method

Figure 10:
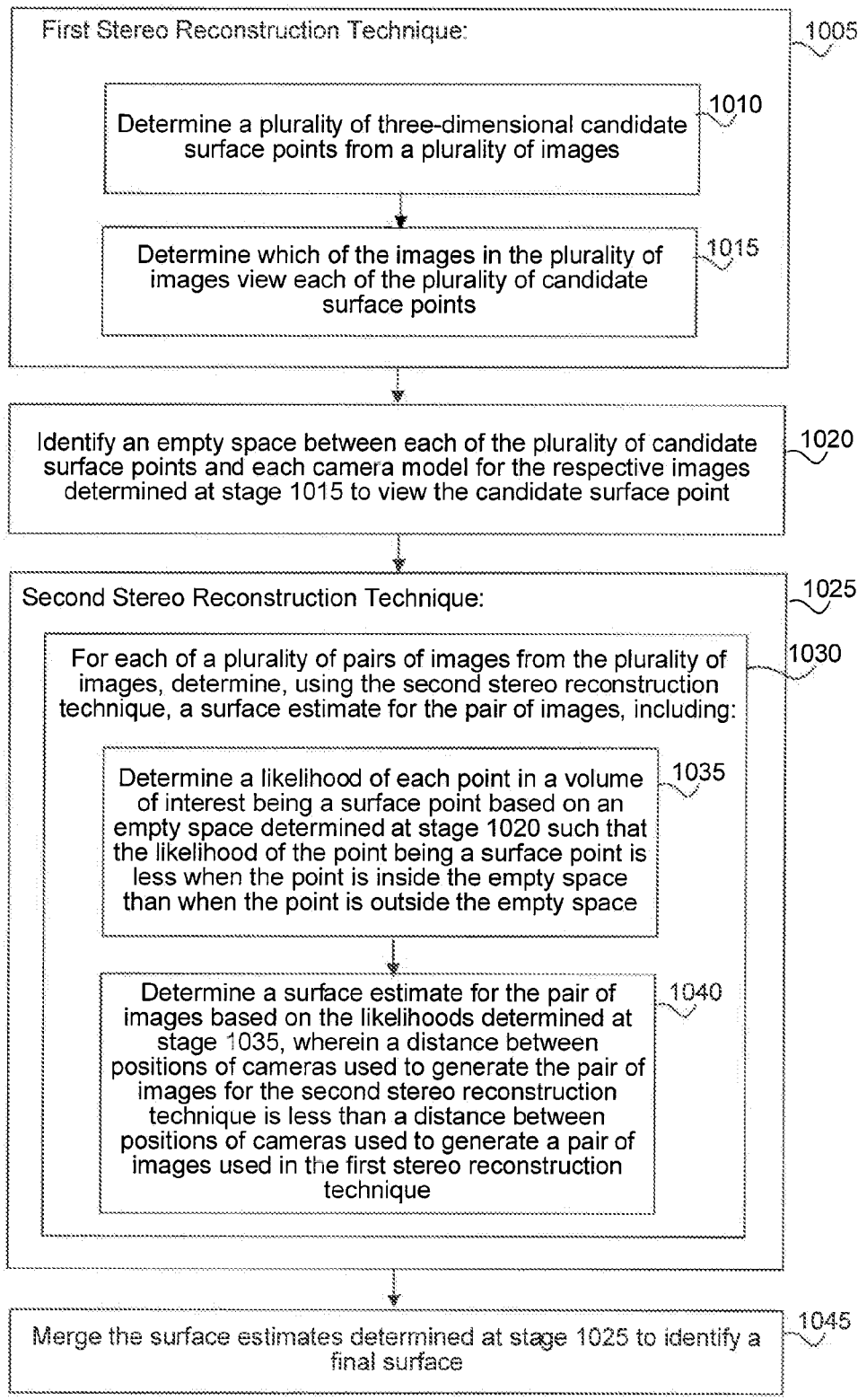
FIG. 10 is a flowchart illustrating a method for determining a final surface for a three-dimensional model using two different stereo reconstruction techniques, according to an embodiment.

FIG. 10 is a flowchart illustrating a method 1000 for determining a final surface for a three-dimensional model using two different stereo reconstruction techniques, according to an embodiment.

At a stage 1005, a first stereo reconstruction technique is applied to a plurality of images. Stage 1005 may include stages 1010 and 1015. At stage 1010, using a first stereo reconstruction technique, a plurality of three-dimensional candidate surface points from the plurality of images is determined. At stage 1015, which of the images in the plurality of images view each of the plurality of candidate surface points is determined.

At a stage 1020, an empty space between each of the plurality of candidate surface points and each camera model for the respective images determined at stage 1015 to view the candidate surface point is identified.

At a stage 1025, a second stereo reconstruction technique is applied to a plurality of pairs of images from the plurality of images. Stage 1025 may include a stage 1030. At stage 1030, for each of a plurality of pairs of images from the plurality of images, using a second stereo reconstruction technique, a surface estimate for the pair of images is determined.

Stage 1030 may include stages 1035 and 1040. At stage 1035, a likelihood of each point in a volume of interest being a surface point is determined based on the empty space identified at stage 1020 such that the likelihood of the point being a surface point is less when the point is inside the empty space than when the point is outside the empty space. At stage 1040, a surface estimate for the pair of images is determined based on the likelihoods determined at stage 1035. A distance between positions of cameras used to generate the pair of images for the second stereo reconstruction technique is less than a distance between positions of cameras used to generate a pair of images used in the first stereo reconstruction technique.

At a stage 1045, the surface estimates determined at stage 1030 are merged to identify a final surface.

VIII. Example Computer Embodiment

In an embodiment, the system and components of embodiments described herein are implemented using well known computers. For example, surface reconstruction system 902 may be implemented using system 1100.

Figure 11:
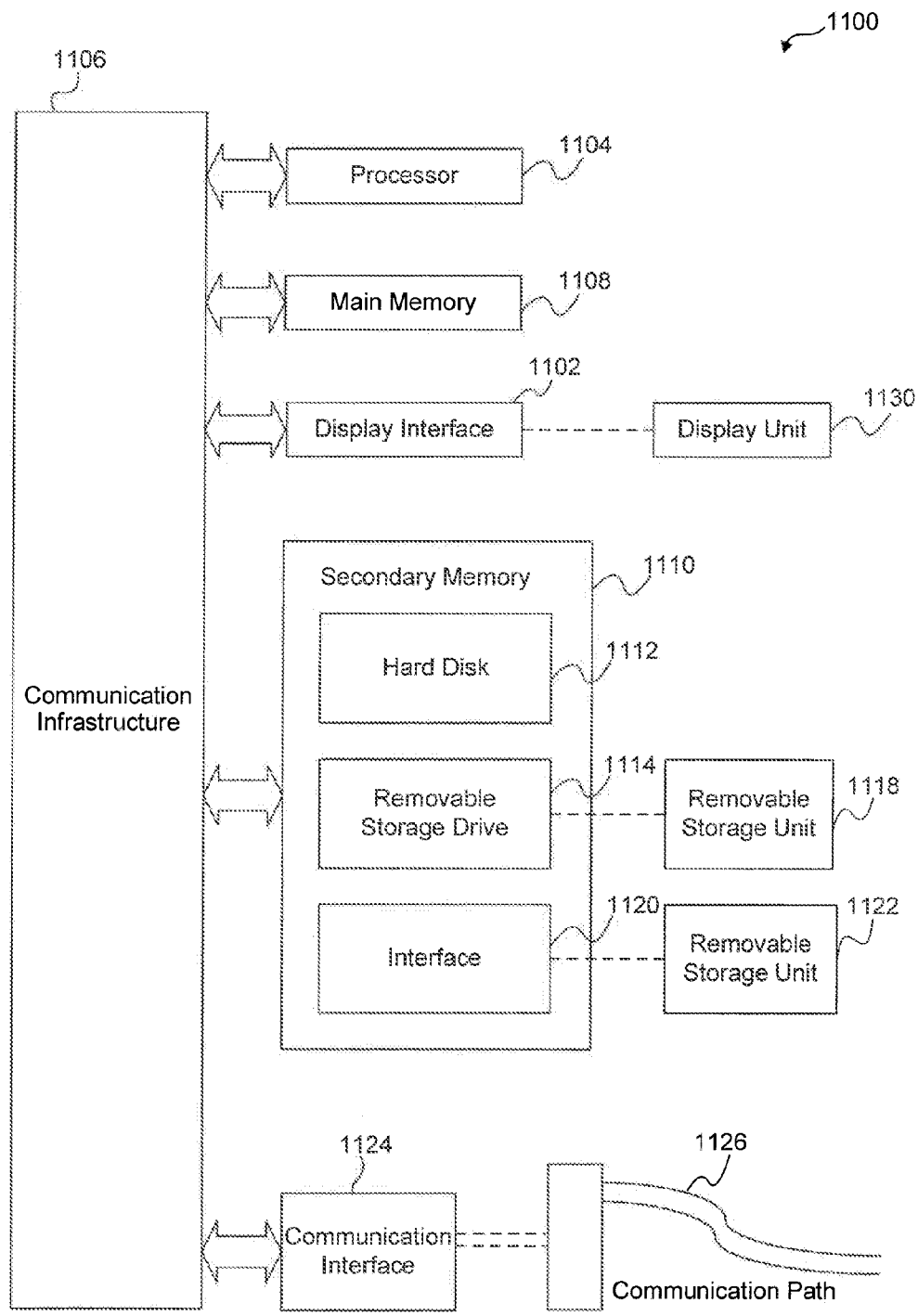
FIG. 11 illustrates an example computer system in which embodiments may be implemented as computer-readable code.

FIG. 11 illustrates an example computer system 1100 in which embodiments may be implemented as computer-readable code. Hardware, software, or any combination of such may embody any of the modules and components in FIG. 9.

If programmable logic is used, such logic may execute on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

For instance, a computing device having at least one processor device and a memory may be used to implement the above-described embodiments. A processor device may be a single processor, a plurality of processors, or combinations thereof. Processor devices may have one or more processor "cores."

Various embodiments are described in terms of this example computer system 1100. After reading this description, it will become apparent to a person skilled in the relevant art how to implement embodiments using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 1104 may be a special purpose or a general-purpose processor device. As will be appreciated by persons skilled in the relevant art, processor device 1104 may also be a single processor in a multi-core/multiprocessor system, such system operating alone, or in a cluster of computing devices operating in a cluster or server farm. Processor device 1104 is connected to a communication infrastructure 1106, for example, a bus, message queue, network, or multi-core message-passing scheme. Computer system 1100 may also include display interface 1102 and display unit 1130. Display interface 1102 allows results of the computer operations to be displayed to a user or an application developer via display unit 1130.

Computer system 1100 also includes a main memory 1108, for example, random access memory (RAM), and may also include a secondary memory 1110. Secondary memory 1110 may include, for example, a hard disk drive 1112 and a removable storage drive 1114. Removable storage drive 1114 may include a floppy disk drive, a magnetic tape drive, an optical disk drive, a flash memory, or the like. The removable storage drive 1114 reads from and/or writes to a removable storage unit 1118 in a well-known manner. Removable storage unit 1118 may include a floppy disk, magnetic tape, optical disk, etc. which is read by and written to by removable storage drive 1114. As will be appreciated by persons skilled in the relevant art, removable storage unit 1118 includes a computer usable storage medium having stored therein computer software and/or data.

In alternative implementations, secondary memory 1110 may include other similar means for allowing computer programs or other instructions to be loaded into computer system 1100. Such means may include, for example, a removable storage unit 1122 and an interface 1120. Examples of such means may include a program cartridge and cartridge interface (such as that found in video game devices), a removable memory chip (such as an EPROM, or PROM) and associated socket, and other removable storage units 1122 and interfaces 1120 which allow software and data to be transferred from the removable storage unit 1122 to computer system 1100.

Computer system 1100 may also include a communications interface 1124. Communications interface 1124 allows software and data to be transferred between computer system 1100 and external devices. Communications interface 1124 may include a modem, a network interface (such as an Ethernet card), a communications port, a PCMCIA slot and card, or the like. Software and data transferred via communications interface 1124 may be in the form of signals, which may be electronic, electromagnetic, optical, or other signals capable of being received by communications interface 1124. These signals may be provided to communications interface 1124 via a communications path 1126. Communications path 1126 carries signals and may be implemented using wire or cable, fiber optics, a phone line, a cellular phone link, an RF link or other communications channels.

In this document, the terms "computer program medium" and "computer usable medium" are used to generally refer to media such as removable storage unit 1118, removable storage unit 1122, and a hard disk installed in hard disk drive 1112. Computer program medium and computer usable medium may also refer to memories, such as main memory 1108 and secondary memory 1110, which may be memory semiconductors (e.g. DRAMs, etc.).

Computer programs (also called computer control logic) are stored in main memory 1108 and/or secondary memory 1110. Computer programs may also be received via communications interface 1124. Such computer programs, when executed, enable computer system 1100 to implement embodiments as discussed herein. In particular, the computer programs, when executed, enable processor device 1104 to implement the processes, such as the stages in the method illustrated by flowchart 900 of FIG. 9 discussed above. Accordingly, such computer programs represent controllers of the computer system 1100. Where embodiments are implemented using software, the software may be stored in a computer program product and loaded into computer system 1100 using removable storage drive 1114, interface 1120, and hard disk drive 1112, or communications interface 1124.

Embodiments also may be directed to computer program products including software stored on any computer useable medium. Such software, when executed in one or more data processing device, causes a data processing device(s) to operate as described herein. Embodiments employ any computer useable or readable medium. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nanotechnological storage device, etc.).

The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method for determining a three-dimensional model from a plurality of images taken of a geographic region by one or more cameras from different perspectives, comprising:
   (a) determining, using a first stereo reconstruction technique: (i) a plurality of three-dimensional candidate surface points from the plurality of images, and (ii) which of the images in the plurality of images view each of the plurality of candidate surface points;
   (b) identifying an empty space between each of the plurality of candidate surface points and each camera model for the respective images determined in (a) to view the candidate surface point;
   (c) for each of a plurality of pairs of images from the plurality of images, determining, using a second stereo reconstruction technique, a surface estimate for the pair of images, the determining a surface estimate (c) for the pair of images comprising:
      (i) determining a likelihood of each point in a volume of interest being a surface point based on an empty space identified in (b) such that the likelihood of the point being a surface point is less when the point is inside the empty space than when the point is outside the empty space; and
      (ii) determining a surface estimate for the pair of images based on the likelihoods determined in (c)(i),
      wherein a distance between positions of cameras used to generate the pair of images for the second stereo reconstruction technique is less than a distance between positions of cameras used to generate a pair of images used in the first stereo reconstruction technique; and
   (d) merging the surface estimates determined in (c) to identify a final surface.

2. The method of claim 1, wherein the likelihood of each point in the volume of interest being a surface point is represented as a voxel grid, the method further comprising:
   (e) determining a shortest distance between each point in the voxel grid and a surface estimate determined in (c)(ii); and
   (f) determining signed distance functions for each point in the voxel grid based on the shortest distances determined in (e),
      wherein the merging (d) includes merging the signed distance functions determined in (f).

3. The method of claim 2, wherein the determining (a) includes determining a surface normal for each of the plurality of candidate surface points, the method further comprising:
   (g) determining a surface estimate for each of the plurality of candidate surface points based on the surface normal; and
   (h) determining a signed distance function for each surface estimate determined in (g),
      wherein the merging (d) includes merging the signed distance functions determined in (h).

4. The method of claim 1, wherein the determining (a) includes providing visibility rays indicating the empty space as output and the identifying an empty space (b) includes identifying the visibility rays.

5. The method of claim 1, further comprising identifying the volume of interest based on the candidate surface points.

6. The method of claim 1, wherein the determining a surface estimate for the pair of images (c)(ii) includes identifying points having a likelihood of being a surface point that matches a threshold.

7. The method of claim 6, wherein the three-dimensional points included in the empty space do not satisfy the threshold.

8. The method of claim 1, wherein the determining a surface estimate (c)(ii) includes augmenting graph weights such that the surface estimate passes through points that satisfy the threshold and does not pass through the empty space.

9. The method of claim 1, wherein the determining a likelihood of each point in a volume of interest being a surface point (c)(i) includes determining a plane including a point in the volume of interest and projecting images determined to view the point onto the plane.

10. The method of claim 1, wherein the first stereo reconstruction technique is wide-baseline stereo and the second stereo reconstruction technique is narrow-baseline stereo.

11. The method of claim 1, wherein each of the images is an oblique image of a geographic area.

12. The method of claim 1, wherein the final surface is a representation of the geographic area.

13. A system for determining a three-dimensional model from a plurality of images taken of a geographic region by one or more cameras from different perspectives, comprising:
   at least one computing device;
   a wide-baseline stereo engine, implemented on the at least one computing device, configured to determine: (i) a plurality of three-dimensional candidate surface points from the plurality of images, and (ii) which of the images in the plurality of images view each of the plurality of candidate surface points;
   an empty space identifier, implemented on the at least one computing device, configured to identify an empty space between each of the plurality of candidate surface points and each camera model for the respective images determined by the wide-baseline stereo engine to view the candidate surface point;
   a volume of interest identifier, implemented on the at least one computing device, configured to, for each of a plurality of pairs of images from the plurality of images, identify a volume of interest in the pair of images;
   a voxel grid, implemented on the at least one computing device, configured to store photo-consistency scores for each point in the volume of interest;
   a narrow-baseline stereo engine, implemented on the at least one computing device, configured to, for each of a plurality of pairs of images from the plurality of images: (i) determine a plane in the volume of interest, (ii) project images determined to view the point onto the plane, (iii) compute the photo-consistency score for each point in the plane based on the projection, wherein a photo-consistency score of a first point inside the empty space is less than a photo-consistency score of a second point outside the empty space, and (iv) determine a surface estimate based on the photo-consistency scores in the voxel grid, wherein the surface estimate includes photo-consistency scores that satisfy a threshold; and
   a merging engine, implemented on the at least one computing device, configured to merge the surface estimates determined by the narrow-baseline stereo engine to determine a final surface.

14. The system of claim 13, wherein the final surface is a representation of the geographic area.

15. The system of claim 13, wherein the wide-baseline stereo engine is configured to provide visibility rays indicating the empty space as output, and the empty space identifier is configured to identify the empty space including the visibility rays.

16. The system of claim 13, wherein the merging engine is configured to determine a signed distance function for each narrow-baseline surface estimate, and, when the merging engine merges the surface estimates determined by the narrow-baseline stereo engine, the merging engine merges the signed distance functions for each narrow-baseline surface estimate to determine the final surface.

17. The system of claim 16, wherein the merging engine is configured to extract the final surface as the zero-distance isosurface surface of the signed distance function.

18. The system of claim 13, wherein the wide-baseline stereo engine is configured to determine: (iii) a surface normal for each of the plurality of three-dimensional candidate surface points, and (iv) a wide-baseline surface estimate for each of the plurality of three-dimensional candidate surface points based on the three-dimensional candidate surface points and surface normals of the three-dimensional candidate surface points; and
   when the merging engine merges the surface estimates determined by the narrow-baseline stereo engine to determine a final surface, the merging engine is configured to merge the surface estimates determined by the narrow-baseline stereo engine with the wide-baseline surface estimates determined by the wide-baseline stereo engine.

19. A computer readable storage medium encoded with a computer program, the program comprising instructions that when executed by one or more processors cause the one or more processors to perform operations to:
   (a) determine, using a first stereo reconstruction technique: (i) a plurality of three-dimensional candidate surface points from the plurality of images, and (ii) which of the images in the plurality of images view each of the plurality of candidate surface points;
   (b) identify an empty space between each of the plurality of candidate surface points and each camera model for the respective images determined in (a) to view the candidate surface point;
   (c) for each of a plurality of pairs of images from the plurality of images, determine, using a second stereo reconstruction technique, a surface estimate for the pair of images, wherein the program comprising instructions that when executed by one or more processors cause the one or more processors to perform operations to determine, using a second stereo reconstruction technique, a surface estimate for the pair of images further cause the one or more processors to perform operations to:
      (i) determine a likelihood of each point in a volume of interest being a surface point based on an empty space identified in (b) such that the likelihood of the point being a surface point is less when the point is inside the empty space than when the point is outside the empty space; and
      (ii) determine a surface estimate for the pair of images based on the likelihoods determined in (c)(i),
      wherein a distance between positions of cameras used to generate the pair of images for the second stereo reconstruction technique is less than a distance between positions of cameras used to generate a pair of images used in the first stereo reconstruction technique; and
   (d) merge the surface estimates determined in (c) to identify a final surface.

20. The computer readable storage medium of claim 19, wherein the final surface is a representation of the geographic area.

21. A method for determining a three-dimensional model from a plurality of images taken of a geographic region by one or more cameras from different perspectives, comprising:
- (a) determining, using wide-baseline stereo, a plurality of three-dimensional candidate surface points from the plurality of images;
- (b) identifying, using wide-baseline stereo, an empty space between each of the plurality of candidate surface points and each camera model for the respective images that view the candidate surface point;
- (c) for each of a plurality of pairs of images from the plurality of images, determining, using narrow-baseline stereo, a surface estimate for the pair of images based on the plurality of candidate surface points and the empty space; and
- (d) merging the surface estimates determined in (c) to identify a final surface.

* * * * *